UNITED STATES PATENT OFFICE.

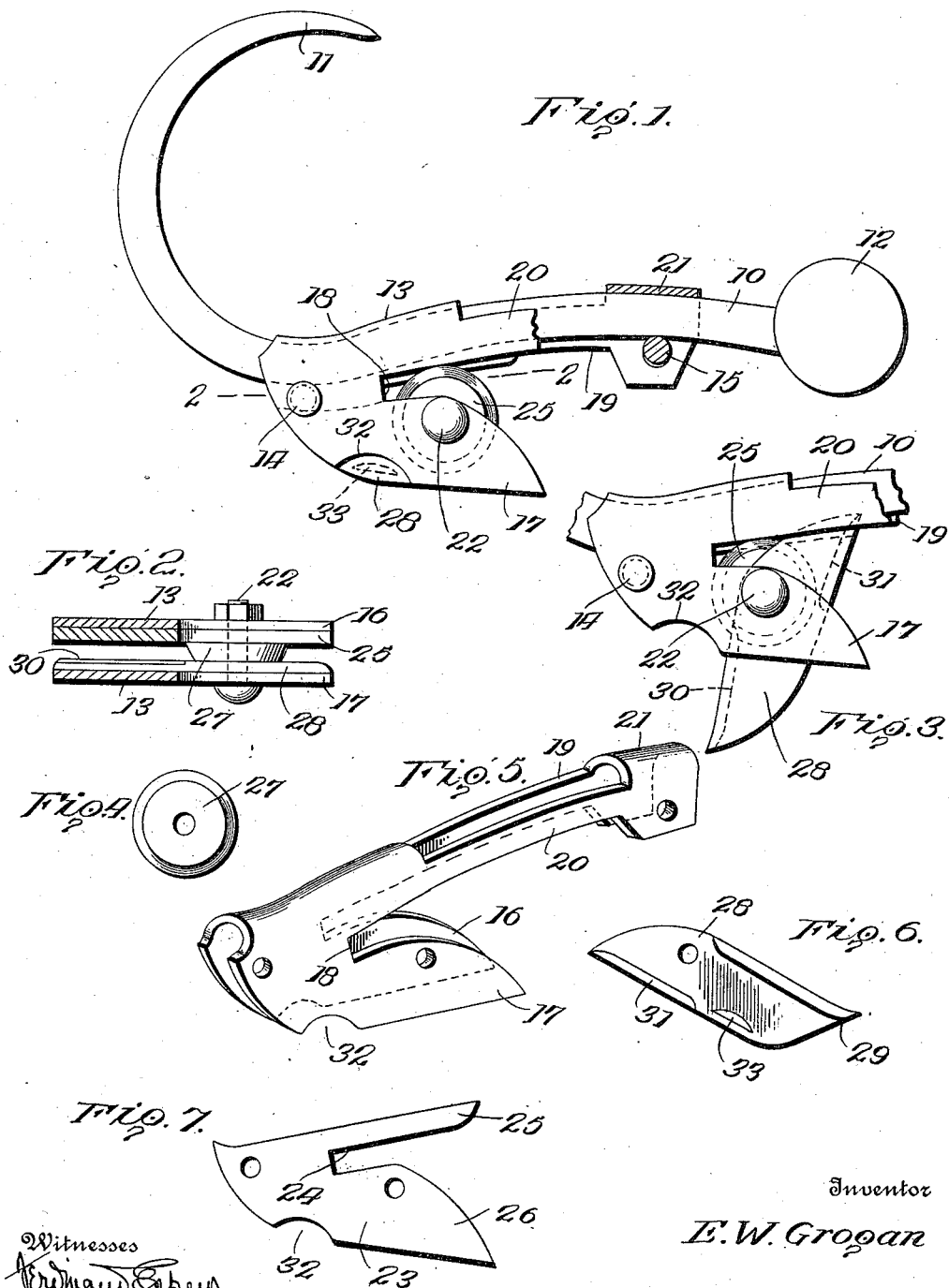

EDWARD W. GROGAN, OF BYERS, TEXAS.

WIRE-CUTTER.

1,045,396.  Specification of Letters Patent.  Patented Nov. 26, 1912.

Application filed December 28, 1911. Serial No. 668,212.

*To all whom it may concern:*

Be it known that I, EDWARD W. GROGAN, citizen of the United States, residing at Byers, in the county of Clay and State of Texas, have invented certain new and useful Improvements in Wire-Cutters, of which the following is a specification.

This invention relates to severing devices, more particularly to implements for severing the binding wires of bales of hay, but which may also be employed for severing binding twine, cords or like articles.

The improved device is designed more particularly for use in connection with the hooks whereby the bales or like packages are handled, and has for one of its objects to improve the construction and increase the efficiency and utility of devices of this character.

Another object of the invention is to produce a device of this character which may be readily attached to a hay hook or other supporting implement and which is actuated by employing the supporting member, such as the hay hook, as a lever to produce the severing action.

With these and other objects in view, the invention consists in certain novel features of construction as hereinafter shown and described, and then specifically pointed out in the claims.

The improved device as before stated, is designed more particularly for use in connection with a hay hook or like implement and for the purpose of illustration is shown thus employed, and in the drawings illustrative of the preferred embodiment of the invention: Figure 1 is a side elevation of a conventional hay hook in inverted position with the improved attachment applied thereto, and partly in section; Fig. 2 is a section on the line 2—2 of Fig. 1; Fig. 3 is a detail view illustrating the manner of arranging the movable cutting blade for use in severing twine, rope, and the like; Fig. 4 is a detached view of the cutting disk; Fig. 5 is a perspective view of the supporting frame; Fig. 6 is a detached view of the movable cutting blade reversed in position; Fig. 7 is a view of the ledger member, detached.

Corresponding and like parts are referred to in the following description and indicated in all the views of the accompanying drawings by the same reference characters.

The improved device may be applied to any suitable supporting structure, but is designed more particularly for use in connection with a hay hook and for the purpose of illustration is shown thus employed, and in the drawings the stock portion of a hay hook is represented at 10, the point or bill of the hook being indicated at 11, and the handle at 12, these parts being of the usual form.

The improved device comprises a body member represented as a whole at 13, and formed from a single sheet of metal preferably steel bent into U-shape and fitting around the stock 10 or other supporting member from the outside and secured thereon by clamp bolts 14—15 which extend through the spaced sides of the member 13. The apertures for the bolts in the member 13 through which the bolts 14—15 extend, are slightly slotted whereby provision is made for adjusting the device to stocks of different sizes.

The member 13 is provided with two depending horn-shaped portions 16—17 spaced below the body of the member 13 whereby recesses or cavities are formed one of which is represented at 18, and also provided with two forwardly extending side members 19—20 connected at their outer ends to a U-shaped terminal 21, the latter designed to bear over the stock 10 of the hook with the spaced side members 19—20 bearing upon opposite sides of the stock. The clamp bolt 15 it will be noted extends through the sides of the U-shaped portion 21. A clamp bolt 22 extends through the horn-shaped members 16—17, and bearing between the horns 16—17 is a "ledger" plate represented as a whole at 23, and provided with two apertures to receive the bolts 14 and 22. The plate 23 is also provided with a recess 24 opening forwardly and with horn-shaped projections 25—26 with their confronting edges diverging outwardly. The inner edge of the projection 25 is sharpened, and mounted for rotation upon the bolt 22 is a disk 27 having a beveled cutting edge operating over the sharpened edge of the member 25 and also projects across the cavity 24. The two members 25 and 27 constitute a shearing device whereby any object which may be forced into the recess 18—24 may be effectually severed. Located between the cutting disk 27 and the horn-shaped projection 17 is another plate represented as a whole at 28, and arranged to bear by one end at 29 when in one position against the bolt 14, which thus limits the movement of the plate 28 in one direction. The shorter forward end of the plate 28 conforms in outline to the inner curved edge of the horn-shaped portion 17 and is provided with knife edges 30—31.

The plate 28 conforms at its shorter end to the forward portion of the horn-shaped projection 17, and at its longer end conforms at one side to the rear portion of the horn-shaped projection, so that when arranged in one position with its rear longer end in contact with the bolt 14, the plate 28 is entirely concealed except for a small portion opposite recesses 32 formed in the projections 16—17 and likewise in the lower edge of the ledger plate 23. The plate 28 is provided with a finger-nail recess or depression 33 which is located opposite the recess 32 when the plate 28 is in its withdrawn position as shown in Fig. 1 to enable the plate to be swung upon the bolt 22 and into the position shown in Fig. 3. When the plate 28 is arranged in its withdrawn position as shown in Fig. 1, it is inactive, or produces no results, and when thus arranged the implement is in condition to be used for severing wires by means of the cutting disk 27. When twine, rope, or like articles are to be severed, the plate 28 will be moved into the position shown in Fig. 3 with the cutting edge 31 extending across the throat of the device and in advance of the cutting disk 27. The implement when thus arranged, may be employed for severing twine, while the projecting longer end of the plate may be employed as a knife-blade for severing cloth or for other purposes. When the plate 28 is arranged in its withdrawn position as shown in Fig. 1, the cutting edge 30 forms a continuation of the recess 32, so that relatively large ropes or like articles may be retained in position during the severing action. The recesses 32 thus co-act with the cutting edge 30 of the blade or plate 28 to materially assist in the severing action.

The attachment may be applied without material structural changes to hay hooks or like instruments of various forms and sizes, and does not interfere with the ordinary employment of the hook, while at the same time the attachment is in convenient position for instant use when required.

All of the parts of the improved attachment are pressed from plate steel and tempered as required, and can thus be manufactured at a small expense and yet possess great durability.

Having thus described the invention, what is claimed as new is:

1. In a device of the class described, a body member adapted to be clamped to a supporting member and provided with a wire-receiving recess, a ledge plate supported within the body member and having a recess registering with the recess of the body, and a cutting member pivoted to said body and movable over the wire-receiving recess.

2. In a device of the class described, the combination with a support, of a body including spaced sides connected to the support at opposite sides thereof and provided with a receiving recess, a ledger member connected to said body and bearing against said support at one side and provided with a receiving recess registering with the recess of the body, and a cutting member movably connected to said body and operating transversely of said recesses.

In testimony whereof, I affix my signature in presence of two witnesses.

EDWARD W. GROGAN. [L. S.]

Witnesses:
WALTER K. GROGAN,
C. E. HARDING.

---

Copies of this patent may be obtained for five cents each, by addressing the "Commissioner of Patents Washington, D. C."